United States Patent [19]

Wakefield et al.

[11] Patent Number: 5,341,285
[45] Date of Patent: Aug. 23, 1994

[54] INTELLIGENT TRANSFORMERLESS SYSTEM FOR TRANSFERRING ENERGY FROM A POWER SOURCE TO AN ISOLATED LOAD

[75] Inventors: Thomas L. Wakefield; George R. Plunkett, both of Anchorage, Ak.

[73] Assignee: Wave Energy Corporation, Anchorage, Ak.

[21] Appl. No.: 913,598

[22] Filed: Jul. 14, 1992

[51] Int. Cl.⁵ ............................................. H02M 3/07
[52] U.S. Cl. ...................... 363/97; 363/16; 363/127; 363/131; 320/1; 320/40
[58] Field of Search ............... 363/127, 128, 131, 132, 363/135, 136, 35, 37, 15, 16, 124; 320/1, 5, 9, 10, 14, 19, 27, 30, 31, 32, 39, 40; 323/259; H02M 3/07

[56] References Cited

U.S. PATENT DOCUMENTS

| | | | |
|---|---|---|---|
| 3,223,915 | 12/1965 | Ryerson et al. | 321/18 |
| 3,372,326 | 3/1968 | Stefanov | 321/24 |
| 3,452,214 | 6/1969 | Martin | 307/96 |
| 3,691,452 | 9/1972 | Aquiar | 323/19 |
| 4,127,895 | 11/1978 | Krueger | 363/86 |
| 4,255,699 | 3/1981 | Calvin | 323/322 |
| 4,260,947 | 4/1981 | Massey | 323/322 |
| 4,352,045 | 9/1982 | Widmayer | 315/291 |
| 4,374,357 | 2/1983 | Olesin et al. | 323/351 |
| 4,649,302 | 3/1987 | Damiano et al. | 307/584 |
| 4,821,166 | 4/1989 | Albach | 363/89 |
| 5,051,881 | 9/1991 | Herold | 320/1 X |
| 5,072,170 | 12/1991 | Crane et al. | 323/235 |
| 5,187,421 | 2/1993 | Naito | 320/1 |

FOREIGN PATENT DOCUMENTS

433605 12/1974 U.S.S.R.
466593 6/1975 U.S.S.R.

Primary Examiner—Emanuel T. Voeltz
Attorney, Agent, or Firm—Arnold, White & Durkee

[57] ABSTRACT

A microprocessor controls multiple electrical switching units to selectively connect an energy accumulator to either a power source or a load. The microprocessor is electrically attached to multiple A/D converters that sense voltages present at various nodes of the circuit. If the power source supplies A.C. power, the switching units operate to periodically connect and disconnect the power source to and from the energy accumulator, to maintain a selected charge on the energy accumulator. Each time the energy accumulator is disconnected from the power source, the microprocessor directs the switching units to connect the energy accumulator to the load. When the load reaches a selected voltage, the switching units .disconnect the load from the energy accumulator. These steps are repeated continuously, to supply a nearly constant D.C. voltage to the load. If a D.C. power source is used, the energy accumulator is connected to the power source until the microprocessor determines that the voltage across the energy accumulator has reached a selected level. After the energy accumulator has been disconnected from the power source, the microprocessor controls the switching units to connect the energy accumulator to the load until the load acquires a selected charge, whereupon the microprocessor instructs the switching units to disconnect the load from the accumulator. These steps are repeated continuously, to supply a nearly constant D.C. voltage to the load.

28 Claims, 9 Drawing Sheets

INTELLIGENT TRANSFORMERLESS SYSTEM FOR TRANSFERRING ENERGY FROM A POWER SOURCE TO AN ISOLATED LOAD

FIELD OF THE INVENTION

The present invention relates to an intelligent apparatus and method for transferring electrical energy from a power source to a load. More particularly, the invention relates to a system equipped with multiple electrical switching units controlled by a microprocessor to selectively connect a power source to an energy accumulator to charge the energy accumulator, to disconnect the power source from the energy accumulator, and to connect the energy accumulator to a load.

BACKGROUND OF THE INVENTION

A number of different systems are known for selectively applying power from a sinusoidal power source to a load. One example is U.S. Pat. No. 3,452,214 to Martin, entitled "Digital Wave Form Division For Power Control." Martin uses an oscillator to provide a timing signal comprising a series of pulses, which is counted by a pair of decade counters. The counters are initiated when a cyclic source waveform increases past zero volts. When the counters count a selected number of pulses, a gate provides a pulse to a silicon controlled rectifier, which in turn enables a transformer to supply electrical power from the sinusoidal power source to a load. The power delivered to the load is varied by changing the selected number of pulses.

A similar system is shown in U.S. Pat. No. 3,691,452 to Aguiar, entitled "Control of AC Power By A Logic Comparator." In Aguiar, a counter keeps track of increments of an oscillator, and digital logic gates determine when the output of the counter matches a digital input signal. No voltage is applied to the load until the output of the counter matches the digital input signal, whereupon silicon controlled rectifiers are triggered, thereby electrically connecting a periodic voltage source to a load, until the silicon controlled rectifiers are reset when the periodic voltage source next reaches zero volts.

Another example of a system for applying power to a load is shown in U.S. Pat. No. 4,260,947 to Massey, entitled "Phase Control Circuit For Regulating Power." In Massey, a sinusoidal source waveform is electrically connected to a load by a triac in response to a control trigger that occurs after pre-set counters reach their maximum values. The triac disconnects the source waveform from the load when a zero crossover detector determines that the source waveform has reached zero volts.

Another example is U.S. Pat. No. 4,352,045 to Widmayer, entitled "Energy Conservation System Using Current Control." Widmayer discloses a control system for electrical load devices such as fluorescent and incandescent lamps. In Widmayer, alternating current (A.C.) is supplied directly to a load; a transistor is used to control the magnitude of the current flowing through the load during the A.C. input voltage waveform. The transistor is turned full on when the A.C. input voltage waveform reaches zero volts, and can be turned off at any point during the input voltage half wave. A capacitor provides an alternate current path after the transistor is turned off, insuring that the load current is not abruptly terminated.

Still another power control circuit is embodied in U.S. Pat. No. 5,072,170 to Crane et al, entitled "Reverse Phase Angle Control Of A.C. Power Loads". Crane discloses both analog and digital arrangements. In the analog arrangement, an output driver is controlled by a pulse driver and an optoelectronic isolator, based on a square wave signal generated by comparing an analog input voltage to a ramp voltage. The output driver and a power supply provide current to turn on an output device. In the digital arrangement, an output device is electrically connected to a power supply. A digital logic circuit is used to turn on a load at zero crossover of a sine wave, and to turn off the load at a selected point within the sine wave.

Although the above-mentioned circuits are useful in some applications, these circuits are not capable of applying D.C. power to a load. One example of a power circuit that does facilitate application of D.C. power to a load is found in U.S. Pat. No. 4,821,166 to Albach, entitled "Power-Supply Circuit." In Albach, an A.C. source is connected to a power-storage capacitor during specific intervals controlled by a rectifier. A transistor switch, connected to the capacitor, is periodically actuated by a control circuit to discharge the capacitor into a load when the A.C. source is not charging the capacitor. Albach is thus said to separate the A.C. power supply and the switching circuitry, thereby preventing introduction of undesired interference such as high frequency voltages and currents on the A.C. source.

Another power circuit that applies D.C. power to a load is shown in U.S. Pat. No. 4,127,895 to Krueger, entitled "Charge-Transfer Voltage Converter." Krueger facilitates conversion of a high voltage A.C. or D.C. source to a D.C. voltage, to charge a load. After the power source charges a first capacitor, selective charging of a second capacitor by the first capacitor is controlled by transistor switches and an amplifier that compares the voltage of the second capacitor to a reference voltage. The second capacitor is directly connected to a load.

Another example of a power circuit that converts A.C. input power to D.C. power to charge a load is U.S. Pat. No. 3,372,326 to Stefanov, entitled "High-Efficiency Low Iron AC-to-Regulated D.C. Converter." In Stefanov, a switch is connected to an input transformer, and controlled by a control means. The output of the transformer is connected in parallel to a storage capacitor, a voltage regulator, and a load. The control means only closes the switch at selected times during the rising portion of the input sine wave. The closure of the switch is determined by the output of the voltage regulator and the input A.C. voltage.

Although the above-mentioned circuits are useful in some applications, they have a number of limitations. For example, some of these arrangements are limited since they require one or more transformers. Such circuits typically are more expensive and heavier than might be desired. Furthermore, the circuits that use transformers are not as efficient as might be needed, since they suffer from power losses caused by hysteresis, eddy currents, "$I^2R$", and other factors normally associated with transformers.

The above-mentioned arrangements that do not utilize transformers are lacking as well. In particular, these arrangements tend not to adequately isolate the load from the power source. For example, although Albach is said to prevent the introduction of interference into the power source, Albach still permits unwanted noise signals, fluctuations, spikes, and the like to be transmitted from the power source to the load. Furthermore, Albach cannot accommodate a non-cyclic source waveform such as a D.C. source.

In addition, many prior arrangements are not as useful as might be desired, since the application or removal of power to or from a load must be coordinated with time at which the power source voltage passes zero volts. For instance, some arrangements begin applying power to a load when the power source voltage passes zero volts, and stop applying power at a selected time. Other arrangements begin applying power to a load at a selected time, and stop applying power when the power source voltage passes zero volts. As a result, these arrangements do not provide a convenient means to deliver a precise quantity of energy to a load at a specific voltage, since either the "start time" or the "stop time" is fixed.

In view of the limitations of the known power supply circuits, an improved power supply is needed. Specifically, it would be advantageous to have a power supply capable of receiving either A.C. or D.C. input power, providing D.C. power to a load, and maintaining isolation between the power source and the load. Furthermore, it would be beneficial for such a system to avoid the use of a transformer. Additionally, it would be useful to selectively control the power supplied to a load, or intermittently provide power to a number of different loads.

BRIEF SUMMARY OF INVENTION

The present invention is directed to overcoming the problems set forth above. In a general sense, the invention involves a computer-controlled system for transferring electrical energy from a power source to a load. The invention includes a plurality of electrical switching units to connect a power source to an energy accumulator, to charge the energy accumulator, to disconnect the power source from the energy accumulator, and to connect the energy accumulator to a load. The operation of the switching units is coordinated by a microprocessor. The microprocessor is electrically connected to a plurality of analog to digital (A/D) converters that sample the voltage across the power source, the energy accumulator, and the load.

In one embodiment of the invention, a D.C. power source is used. A microprocessor instructs certain switching units to electrically connect the D.C. power source to the energy accumulator. The microprocessor also monitors the voltage across the energy accumulator. When the voltage stored in the energy accumulator is equal to a selected voltage, the microprocessor instructs the switching units to disconnect the energy accumulator from the power source. Then, the microprocessor instructs the switching units to electrically connect the energy accumulator to the load. These steps are performed repeatedly, so that a nearly constant D.C. voltage is provided to the load.

In another embodiment of the invention, the power source supplies A.C. power. The microprocessor monitors the voltage provided by the power source until the source voltage has a selected phase. At this point, the microprocessor instructs the switching units to electrically connect the power source to the accumulator. When the voltage of the power source reaches a second phase, the switching units automatically disconnect the energy accumulator from the power source. The microprocessor then instructs the switching units to connect the energy accumulator to the load. The energy accumulator is electrically connected to the load until the voltage across the load reaches a selected level; at that time, the switching units automatically disconnect the energy accumulator from the load. These steps are performed repeatedly so that a nearly constant D.C. voltage is provided to the load.

DESCRIPTION OF DRAWINGS

The nature of the invention, as well as objects and advantages thereof, will become more apparent to those skilled in the art after considering the following detailed description in connection with the accompanying drawings, in which like reference numerals designate like parts throughout, wherein.

DESCRIPTION OF PREFERRED EMBODIMENTS CONFIGURATIONS

Figure 1:
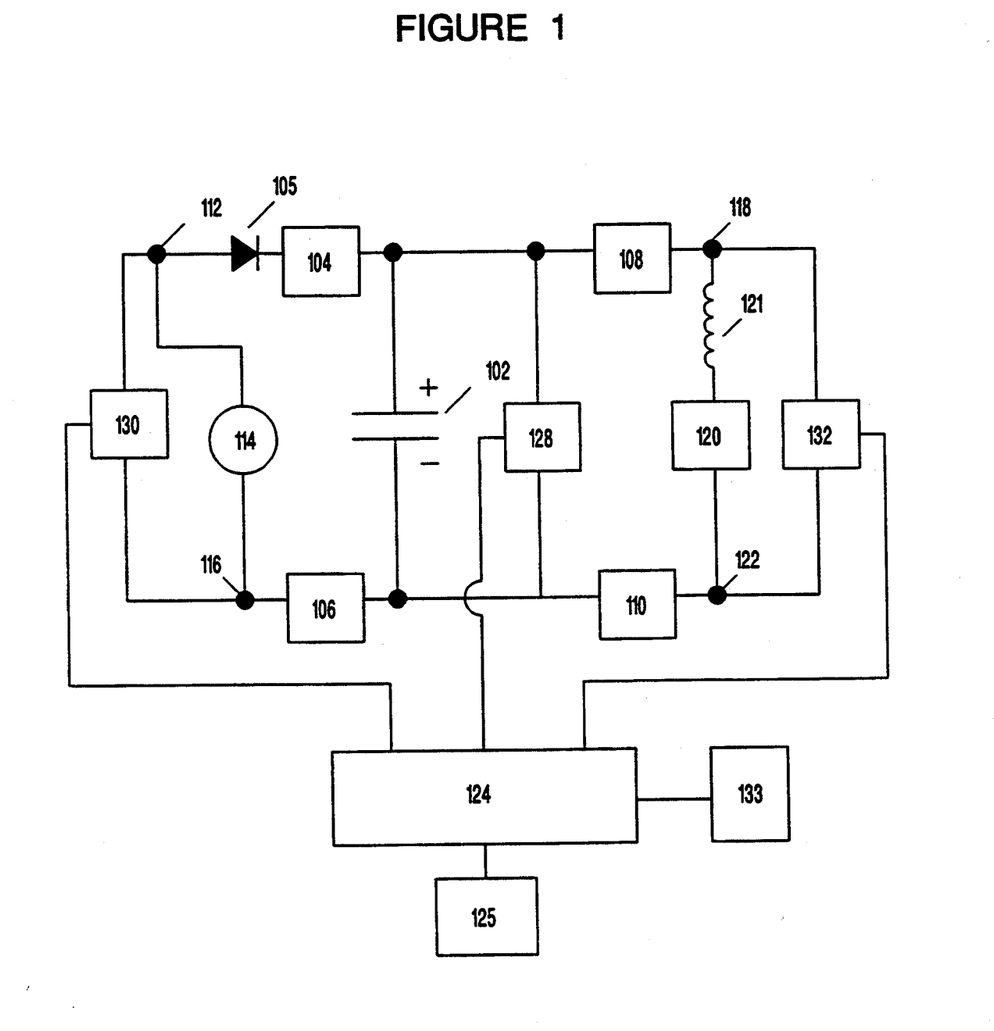
FIG. 1 is a block diagram of hardware and electrical interconnections of the present invention.

The hardware components and electrical interconnections of the invention are indicated in FIG. 1 as a circuit 100. The circuit 100 includes an energy accumulator 102, which in a preferred embodiment comprises a capacitor or another electrical device capable of storing and discharging electrical energy received from A.C. power supplies of various frequencies. The energy accumulator 102 supplies D.C. power to a load 120, which is typically a capacitive load. In one embodiment of the invention, the energy accumulator 102 comprises a 4000 $\mu F$ 25 V capacitor, to provide a 2 amp trickle current to a load 120 comprising a 12 volt battery. Electrically connected to the energy accumulator 102 are a pair of input switching units 104, 106, and a pair of output switching units 108, 110.

The input switching unit 104 is electrically connected to the cathode of a diode 105, the anode of which is electrically connected to a first node 112. Inclusion of a resistor, inductor, or other suitable form of impedance between the power source 114 and the input switching unit 104 is contemplated, if desired, to regulate the speed at which the energy accumulator 102 is charged by the power source 114. The input switching unit 106 is electrically connected to a second node 116. The power source 114 may be either an A.C. or a D.C. source. The output switching unit 108 is electrically connected to a third node 118, and the output switching unit 110 is electrically connected to a fourth node 122. The diode 105 prevents the energy accumulator 102 from receiving a negative voltage from the power source 114.

Figure 1A:
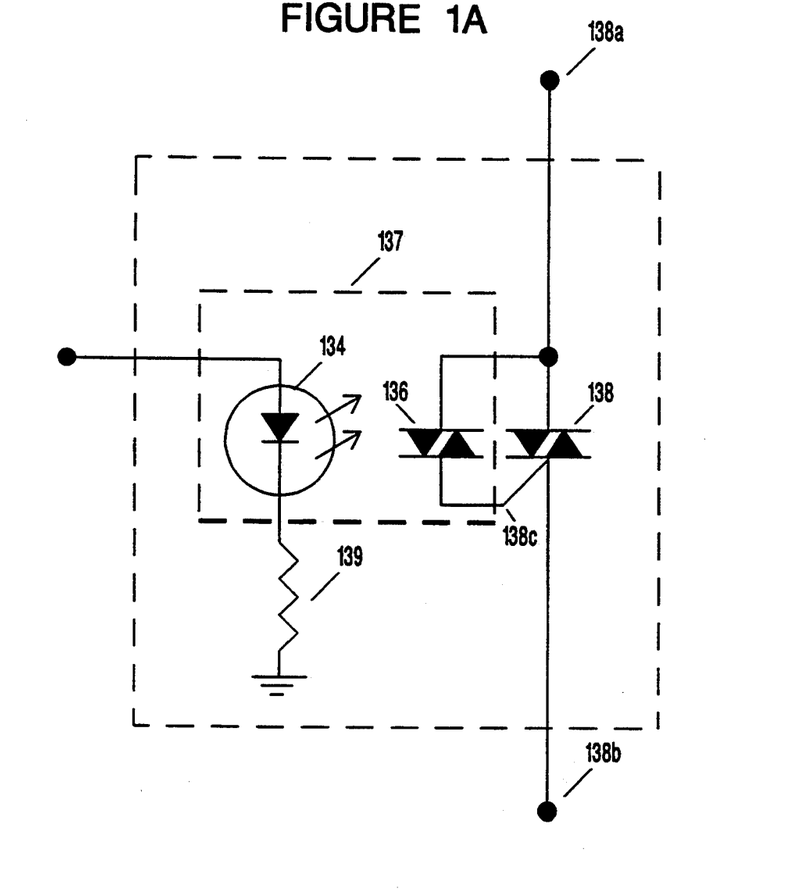
FIG. 1A is an electrical schematic diagram illustrating one embodiment of a switching unit 104, 106, 108, 110 of the invention.

If the power source 114 provides A.C. power, the invention may advantageously utilize switching units such as those shown in FIG. 1A are utilized. Specifically, each of the switching units 104, 106, 108, 110 comprises a light emitting diode (L.E.D.) 134, an optical triac 136, and a power triac 138. In a preferred embodiment of the invention, the L.E.D. 134 and the optical triac 136 are provided by a package 137 such as an Isocom ™ model MCP3009GI package. The anode of the L.E.D. 134 is electrically connected to a microprocessor 124, and the cathode of the L.E.D. 134 is electrically connected to a resistor 139 that is grounded. When the L.E.D. 134 receives a pulse signal from the microprocessor 124, the L.E.D. 134 emits light, which triggers the optical triac 136, in turn triggering a gate 138c of the power triac 138. When the gate 138c of the power triac 138 is triggered, the triac 138 provides a low impedance path between its terminals 138a and 138b until the flow of current between the terminals 138a, 138b falls below the threshold of the triac 138. Using the switching unit 104 as an example, the terminal 138a is electrically connected to the power source 114, and the terminal 138b is electrically connected to the energy accumulator 102.

Figure 1B:
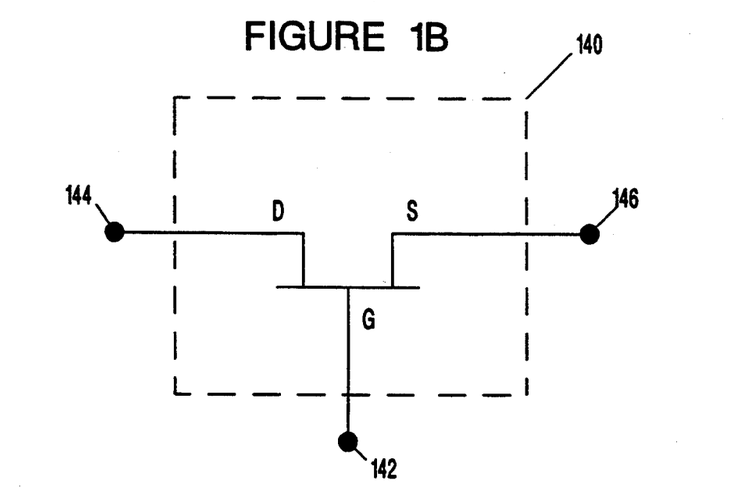
FIG. 1B is an electrical schematic diagram illustrating another embodiment of a switching unit 104, 106, 108, 110 of the invention.

If the power source 114 provides D.C. power, the invention may advantageously utilize switching units such as those shown in FIG. 1B. Specifically, each of the switching units 104, 106, 108, 110 comprises an insulated gate field effect transistor (IGFET) 140. Using the switching unit 104 as an example, the gate 142 of the IGFET 140 is electrically connected to the microprocessor 124, the drain 144 is electrically connected to the power source 114, and the source 146 is electrically connected to the energy accumulator 102.

Alternatively, it is contemplated that the switching units 104, 106, 108, 110 may comprise silicon controlled rectifiers, vacuum tubes, tunnel diodes, or other devices capable of gating current or voltage in response to an input signal.

The load 120 and a low impedance inductor 121 are connected in series between the nodes 118, 122. The inductance of the inductor 121 is selected so that the inductor 121 will force the voltage across the load 120 to zero as the energy accumulator 102 is disconnected from the load 120. The inductor 121 additionally functions to prevent a rapid increase in current through the load 120 when the load 120 is first connected to the energy accumulator 102.

In a preferred embodiment of the invention, the microprocessor 124 may be an Intel® 8051 or 8031 microprocessor. The microprocessor 124 is electrically connected to a memory 125. The memory 125 may be a component that is independent from the microprocessor, or may be "on-board" the microprocessor. The microprocessor 124 has two on-board timers, T1 and T2, that operate in the same way as each other. Using T1 as an example, after T1 is loaded with a desired "count" and started, T1 advances incrementally synchronously with the microprocessor's clock cycle. When T1 passes a constant pre-determined number, T1 "overflows" and causes a microprocessor interrupt.

The microprocessor 124 is electrically connected to three A/D converters. A first A/D converter 128 is electrically connected to the terminals of the energy accumulator 102. A second A/D converter 130 is electrically connected to the first and second terminals 112, 116. A third A/D converter 132 is electrically connected to the third and fourth terminals 118, 122.

Figure 1C:
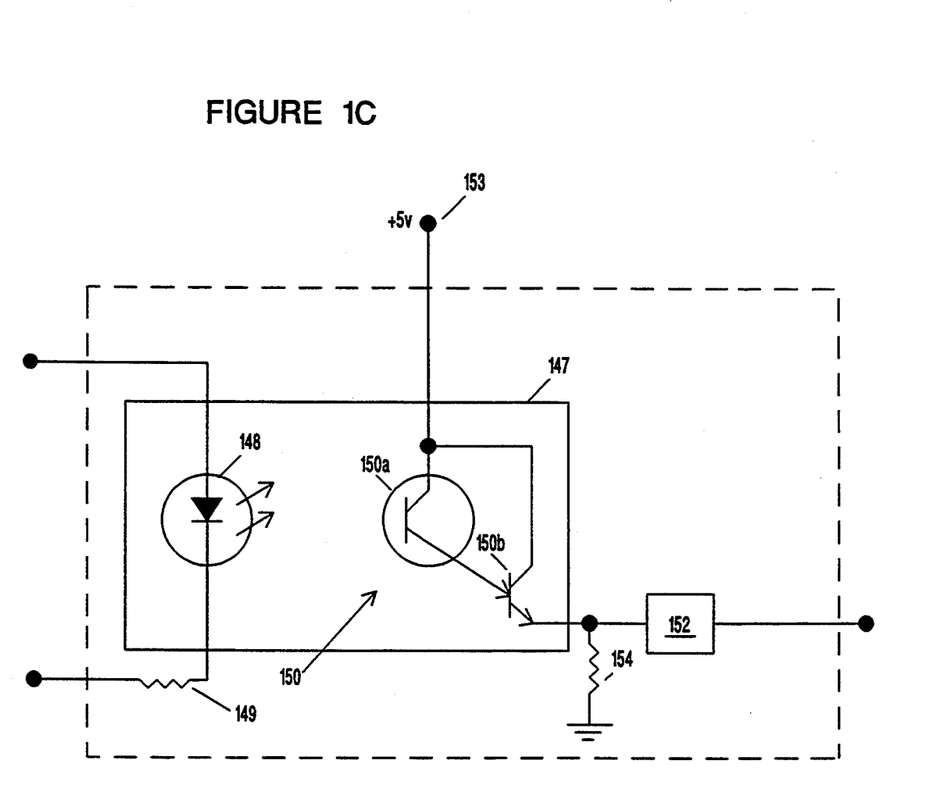
FIG. 1C is an electrical schematic diagram illustrating one embodiment of an A/D converter 128, 130, or 132.

In a preferred embodiment, each A/D converter 128, 130, 132 is configured as shown in FIG. 1C. Thus, each A/D converter includes an L.E.D. 148, a current-limiting resistor 149, a Darlington amplifier 150 comprising a phototransistor 150a and a transistor 150b, an A/D chip 152, and a resistor 154. In the preferred embodiment, the L.E.D. 148 and the Darlington amplifier 150 are provided by a package 147 such an Isocom ™ 4N32 package, and the A/D chip 152 comprises a National Semiconductor® model 0809 eight-channel analog to digital converter. Using the A/D converter 128 as an example, the anode of the L.E.D. 148 is electrically connected to the anode of the energy accumulator 102, the cathode of the L.E.D. 148 is electrically connected to the resistor 149, and the resistor 149 is electrically connected to the cathode of the energy accumulator 102. The collectors of the phototransistor 150a and the transistor 150b are electrically connected to a source voltage 153, such as 5 volts, and the emitter of the transistor 150b is electrically connected to the A/D chip 152. The emitter of the transistor 150b is also electrically connected to a resistor 154. The Darlington amplifier 150 acts like a voltage divider-when a light signal is received from the L.E.D. 148, the transistors 150a and 150b turn on, thereby increasing the voltage at the emitter of the transistor 150b. Accordingly, the voltage across the resistor 154 also increases, as does the voltage supplied to the A/D chip 152. The A/D chip 152 then supplies the microprocessor 124 with a digital representation of the analog signal generated by the amplifier 150 and the L.E.D. 148, based on the input to the L.E.D. 148.

The circuit 100 additionally includes a display 133, electrically connected to the microprocessor 124. The display 133 may comprise one or more L.E.D.s, light bulbs, liquid crystal displays, speakers, tone generators, or other suitable devices to provide one or more optical or audio signals in response to signals from the microprocessor 124.

Figure 1D:
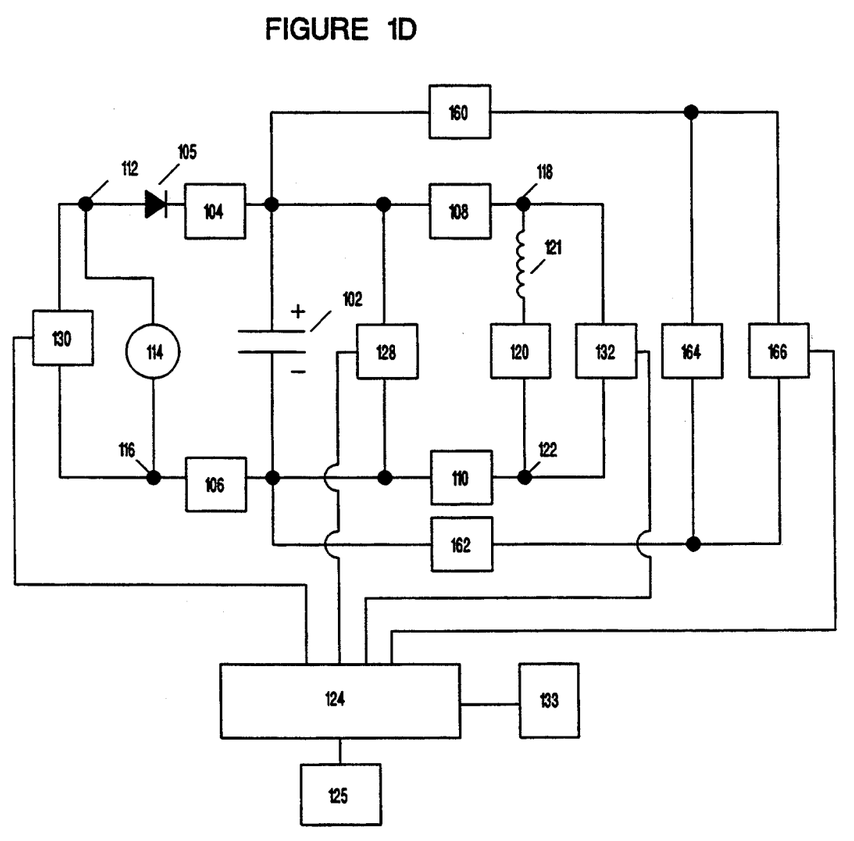
FIG. 1D is a block diagram of an enhancement of the hardware components and interconnections of FIG. 1.

To facilitate testing of circuit 100 in the manner described below, an enhancement of the embodiment described above is contemplated (FIG. 1D). This embodiment employs the circuit 100 of FIG. 1, along with a number of added components. In particular, two supplementary switching units 160, 162 are provided, each being electrically interposed between the energy accumulator 102 and a supplementary load 164. The switching units 160, 162 may be configured as shown in FIGS. 1A or 1B. A supplementary A/D converter 166 is electrically connected across the supplementary load 164, and electrically connected to the microprocessor 124. The supplementary A/D converter 166 is configured as shown in FIG. 1C.

OPERATION

Figure 2:
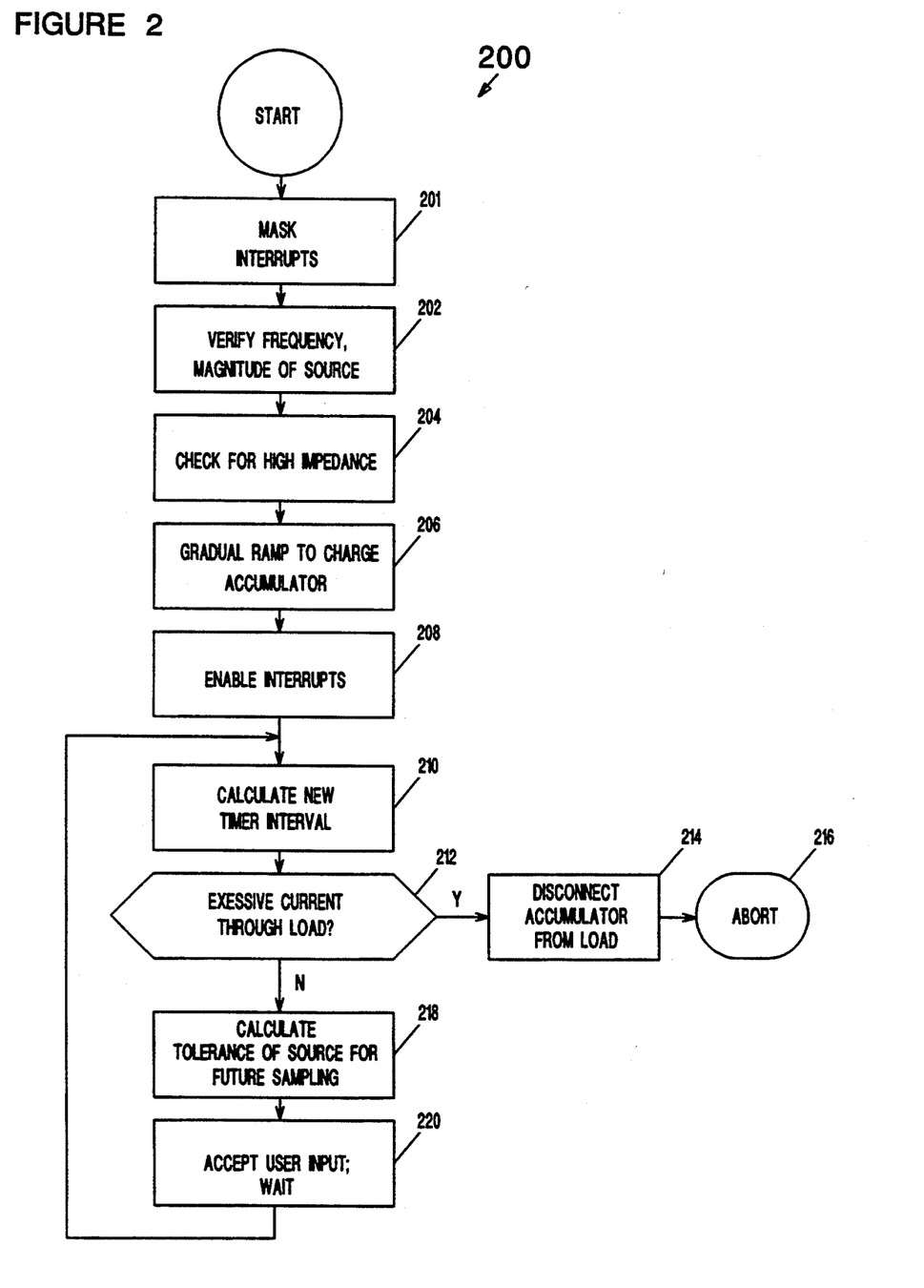
FIG. 2 is a flowchart illustrating the operation of a first embodiment of the invention utilizing an A.C. power source.
Figure 3:
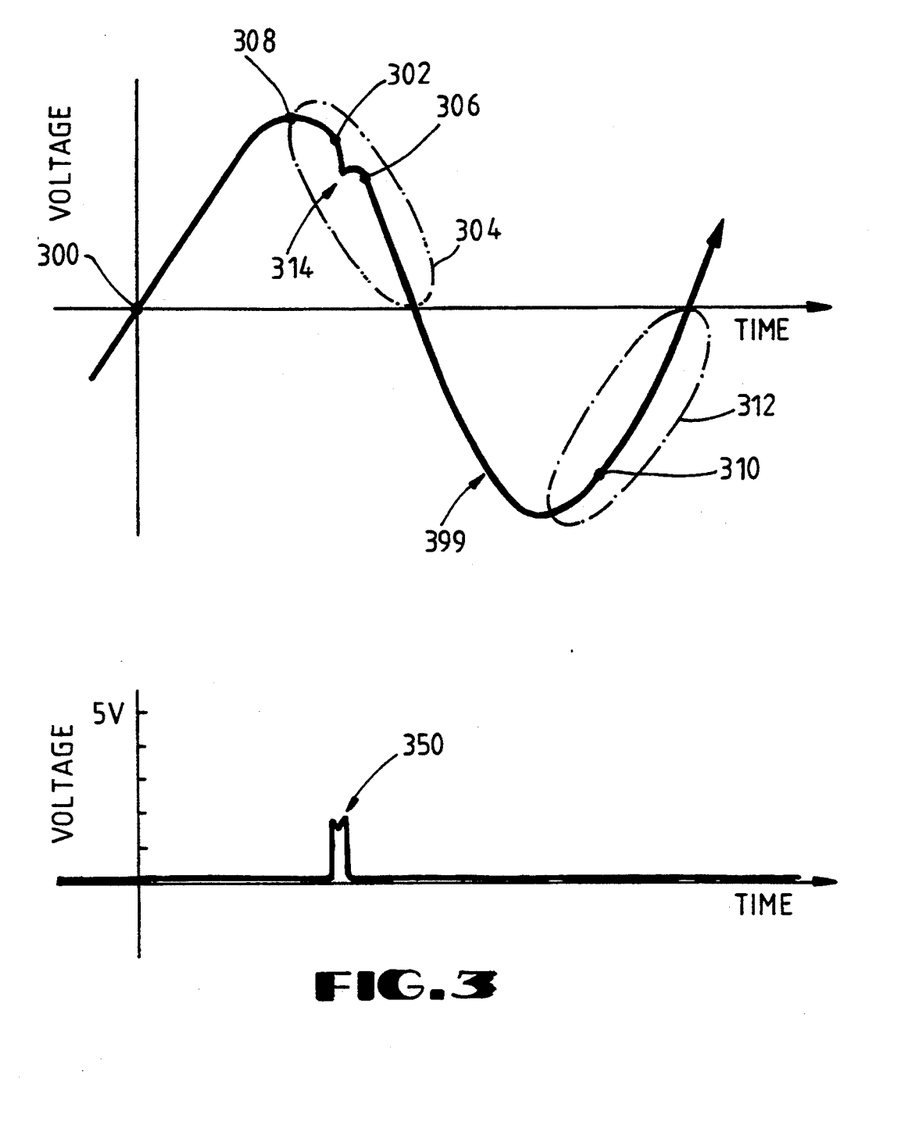
FIG. 3 is a graph illustrating the operation of the embodiment of the invention shown in FIG. 2.

Generally, the invention receives power from a power source 114 and supplies D.C. power to a load 120. The operating sequence of one embodiment is shown in FIG. 2, in the form of a number of tasks 200. In this embodiment, the power source 114 provides a periodic source voltage waveform (shown in FIG. 3 as 399). Although a sinusoidal A.C. waveform 399 is used in the present discussion for ease of understanding, it is contemplated that other periodic waveforms may be used, e.g. square wave, sawtooth, etc. Tasks 210, 212, 218, and 220 are repeated continuously while the circuit 100 is operating. Task 201 is performed soon after the circuit 100 is "cold-started", i.e. when the circuit first receives power. In task 201, all microprocessor interrupts are masked to enable the circuit 100 to perform a number of self-tests in task 202 without interruption. In one of the self-tests performed in task 202, the microprocessor 124 and the A/D converter 130 measure the frequency and peak amplitude of the power source 114.

Next, in task 204 the microprocessor instructs supplementary switching units 160, 162 to electrically connect the power source 114 to the supplementary load 164 for one cycle of the source voltage waveform 399. During this period, the microprocessor 124 directs the supplementary A/D converter 166 to measure the voltage across the load 164. If this voltage is less than a pre-calibrated level, this indicates that the circuit 100 contains an unusually high impedance, causing the load 120 to be under-powered. This might be an indication that a component of the circuit 100 is overloaded. Therefore, the microprocessor 124 transmits a signal to the display 133 to alert the user of this condition, and waits for input from the user.

However, if task 204 detects the proper voltage across the load 120, the microprocessor 124 in task 206 selectively triggers the input switching units 104, 106 to gradually "step-up" the charge on the energy accumulator 102 during a series of gradually increasing intervals. To accomplish this, the microprocessor 124 starts T1 each time the source voltage waveform 399 increases past zero volts. When T1 expires, the microprocessor 124 instructs the switching units 104, 106 to electrically connect the power source 114 to the energy accumulator 102. In each cycle, the power source 114 is automatically disconnected from the energy accumulator 102 when the switching units 104, 106 detect that the energy accumulator 102 has been charged to a selected level.

During each cycle of the power source 114, T1 is loaded with successively smaller counts; thus, T1 expires sooner in each successive cycle of the power source 114, thereby connecting the power source 114 to the energy accumulator 102 earlier in each cycle of the power source 114. Thus, the energy accumulator 102 is charged for successively longer periods of time. T1 is advanced in this fashion until the energy accumulator 102 has acquired the desired charge. The microprocessor 124 makes this determination by detecting whether the voltage across the energy accumulator 102 matches a selected voltage stored in the memory 125. Alternatively, the selected voltage may be supplied by an on-board potentiometer, adjusted by the user. Gradual charging in accordance with these steps prevents the circuit 100 from receiving a large, possibly damaging, initial current from the power source 114. Furthermore, gradually charging the energy accumulator 102 serves to minimize or eliminate possible stress placed upon other electrical components (not shown) that may be sharing the power supply 114.

After the energy accumulator 102 is initially charged, task 208 enables microprocessor interrupts. During the ongoing operation of the circuit 100, as well as the "boot-up" operation in task 206, T1 is activated when the source voltage waveform 399 increases past zero. In task 210, then, the microprocessor 124 calculates the T1 count necessary to connect the power source 114 to the energy accumulator 102 at the proper time to maintain the desired voltage across the energy accumulator 102. Therefore, if task 210 determines (as explained hereinbelow) that the voltage of the energy accumulator 102 is lower than desired, task 210 loads T1 with a smaller value. If the program has recently been "coldstarted", and the voltage across the energy accumulator 102 has not yet been measured, T1 is loaded with the value last used in task 206.

In query 212, the microprocessor 124 determines whether an excessive amount of current is flowing through the load 120. The microprocessor 124 makes this calculation based upon measurements of the voltage across the energy accumulator 102 at two designated times, as described in greater detail below. These measurements are indexed to a lookup table stored in the memory 125. This lookup table cross-references various energy accumulator 102 voltage levels with the corresponding levels of current produced by the energy accumulator 102, based upon the voltage measurements, the time between the voltage samples, the capacitance of the energy accumulator 102, etc. Thus, the current flowing to the load 120 may be easily determined.

If an excessive amount of current is flowing through the load 120, task 214 effectively disconnects the energy accumulator 102 from the load 120 by suppressing the periodic trigger signals normally sent to the output switching units 108, 110. Furthermore, in task 214 the microprocessor 124 transmits a signal to the display 133 to alert the user of the high current condition. Then, in task 216 the routine 200 is aborted by disabling all interrupts. However, if the current through the load 120 is acceptable, the routine 200 advances to task 218. In task 218, the microprocessor 124 predicts the value of the source voltage waveform 399 at a future sampling point. Specifically, task 218 calculates the expected magnitude of the source voltage waveform 399 at the sampling point, as well as the expected slope of the sinusoid at that point. This is explained in greater detail below.

Then, the microprocessor 124 in task 220 accepts any inputs from a user, via a keyboard or other input device (not shown). Also during task 220, the microprocessor 124 performs any actions required by the user's input. For example, the program 200 will terminate if the user directs the circuit 100 to shut down; such a "shutdown" may be accomplished with an "off" switch (not shown) provided with the circuit 100. Since the tasks 210, 212, 218, and 220 are only performed once for each cycle of the source voltage waveform 399, the microprocessor 124 pauses in task 220 until the current cycle of the source voltage waveform 399 ends.

Figure 2A:
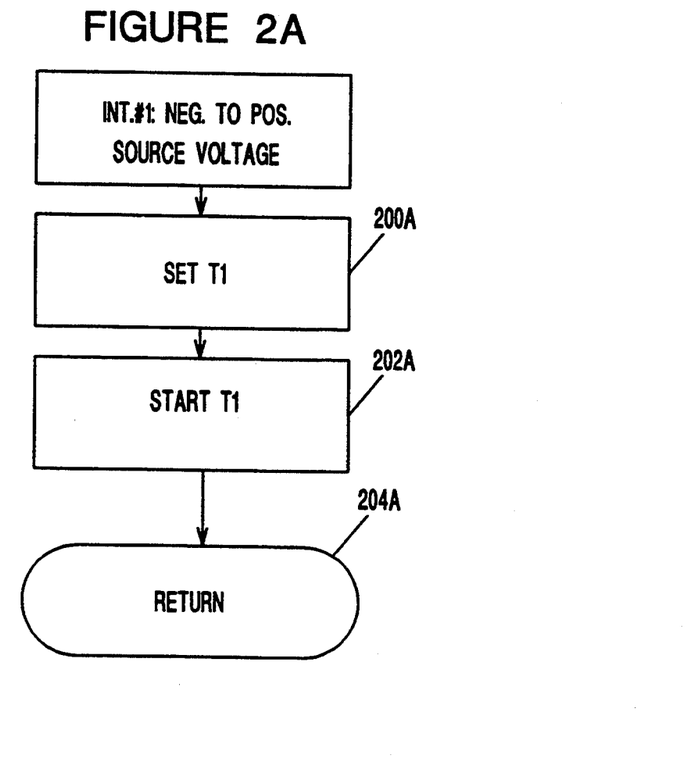
FIG. 2A is a flowchart illustrating the operation of one microprocessor interrupt of the invention.

The routine 200 works in conjunction with various microprocessor interrupts, shown in FIGS. 2A–2D. One microprocessor interrupt, shown in FIG. 2A, is triggered when the microprocessor 124 detects that the source voltage waveform 399 is increasing past zero. At this point, the source voltage waveform 399, shown in FIG. 3 by reference numeral 399, has a phase of about 0°. The 0° phase position of the source voltage waveform 399 is indicated by reference numeral 300. The 0° phase position 300 marks the beginning of a cycle of the signal provided by the A.C. power source 114. The operation of the invention is similarly cyclical, being synchronized with the power source 114. After task 200A loads T1 with the count calculated in task 210 of the main program, task 202A starts T1, and task 204A returns control to the main program 200.

Figure 2B:
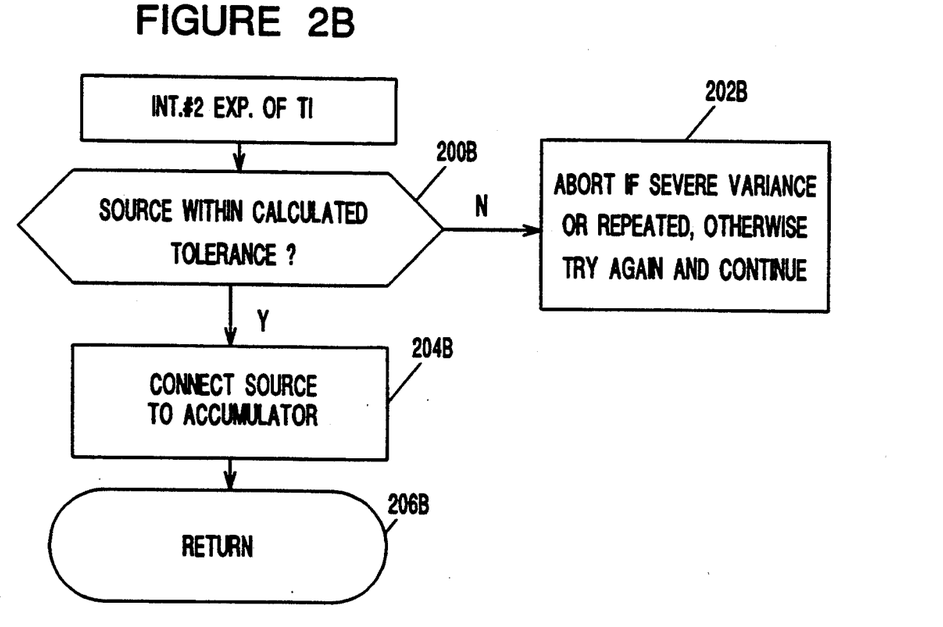
FIG. 2B is a flowchart illustrating the operation of another microprocessor interrupt of the invention.

Another microprocessor interrupt, shown in FIG. 2B, occurs when T1 expires. This event will usually occur on the "positive back-slope" of the source voltage waveform 399, at a point such as point 302 of FIG. 3. "Positive back-slope" refers to the portions of the sinusoidal source voltage waveform 399 where the voltage is positive and decreasing (designated in FIG. 3 as 304).

Query 200B determines whether the source voltage waveform 399 is within the tolerances calculated in task 218 of the main program. Specifically, query 200B measures the source voltage waveform 399 at two different times, and utilizes these measurements to calculate the magnitude and slope of the source voltage waveform 399. If the source voltage waveform 399 is not within the calculated tolerances, the power source 114 might be experiencing a transient signal or other power fluctuation. In this case, task 202B determines whether the irregularity of the source voltage waveform 399 requires any action. This depends upon the power requirements of the particular application for which the circuit 100 is used. If, for example, the circuit 100 is being used to supply power to a simple fish tank heater, slight aberrations in the source voltage waveform 399 may be ignored. However, if the circuit 100 is being used to provide power for computer equipment that is sensitive to power supply variations, aberrations in the source voltage waveform 399 will require aborting the routine 200 and using another power supply. Therefore, if necessary, the microprocessor 124 in task 202B transmits a signal to the display 133 to alert the user of this condition, and the routine 200 is aborted. The standards for this decision are contained in the memory 125.

If no action is required, operation of the circuit 100 continues in task 204B, where the microprocessor 124 sends a trigger signal 350 to the switching units 104,106. When the input switching units 104, 106 receive the trigger signal 350, the input switching units 104,106 electrically connect the A.C. power source 114 to the energy accumulator 102. When the power source 114 is initially connected to the energy accumulator 102, the source voltage waveform 399 experiences a slight drop in voltage, shown by a notch 314. However, the notch 314 ceases when the input switching units 104, 106 determine that the current flow through the energy accumulator 102 is less than a selected threshold level, and accordingly disconnect the power source 114 from the energy accumulator 102. This condition will occur, for example, at a point 306. After the power source 114 has been connected to the energy accumulator 102, task 206B returns control to the main program. It is typically desirable to use the "positive backslope" of the source voltage waveforms 399 so that the charge voltage of the energy accumulator can be limited. If the power source 114 were to be electrically connected to the energy accumulator 102 on the "positive frontslope" of the source voltage waveform 399, then the energy accumulator would necessarily be charged to the peak value of the power source waveform 399 (designated in FIG. 3 as 308).

Figure 2C:
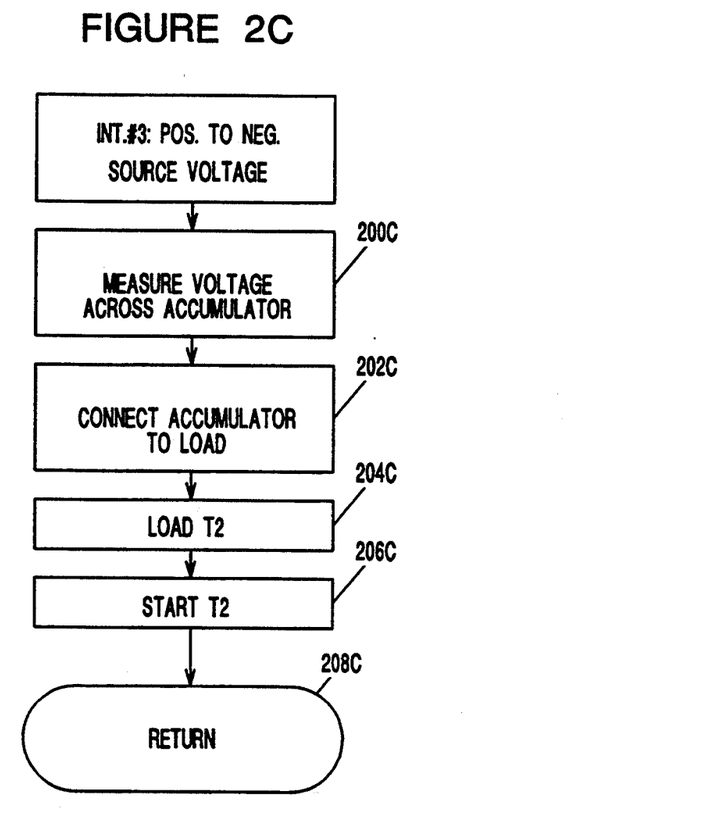
FIG. 2C is a flowchart illustrating the operation of yet another microprocessor interrupt of the invention.

Another microprocessor interrupt, shown in FIG. 2C, is triggered when the source voltage waveform 399 decreases past zero. In task 200C, the microprocessor 124 utilizes the A/D converter 128 to measure the voltage across the energy accumulator 102. This measurement will be used to determine the amount of current flowing through the load 120, as discussed above. Then, the microprocessor 124 in task 202C sends trigger signals to the switching units 108, 110 to electrically connect the energy accumulator 102 to the load 120. The microprocessor 124 in task 204C loads T2, and in task 206C starts T2. Control is returned to the main program in task 208C. The T2 timer, as discussed in greater detail below, is used to coordinate measurements necessary to query 212 of the main program.

Figure 2D:
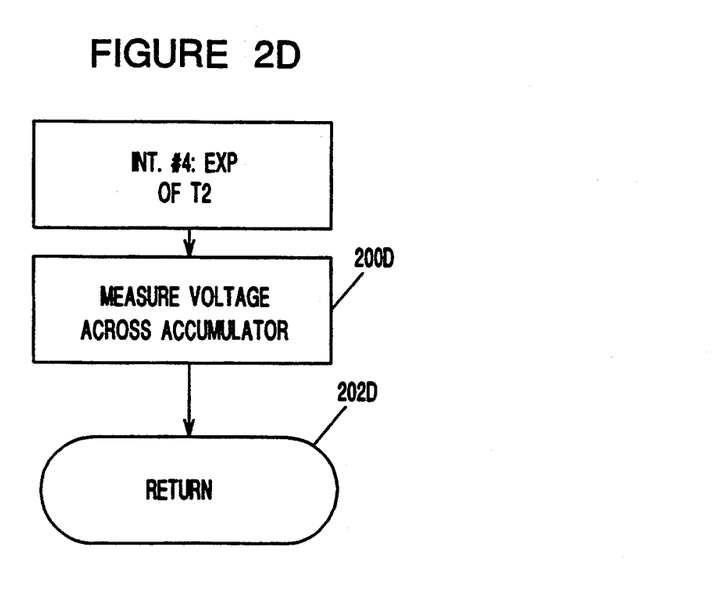
FIG. 2D is a flowchart illustrating the operation of still another microprocessor interrupt of the invention.

Another interrupt, shown in FIG. 2D, occurs when T2 expires. Specifically, task 200D measures the voltage across the energy accumulator 102, and returns control to the main program in task 202D. This measurement will be used to calculate the amount of current flowing in the load 120.

As an alternative embodiment (not shown) to the steps described above, it is understood that the invention can store a negative charge on the energy accumulator 102, and discharge this voltage to the load 120. Specifically, in this procedure the microprocessor 124 triggers the input switching units 104, 106 at a reference point 310, located on the "negative back-slope" of the source voltage waveform 399. The "negative backslope" is the portion of the source voltage waveform 399 where the signal is negative and increasing (shown in FIG. 3 as 312). The energy accumulator 102 is automatically disconnected from the power source 114 when the input switching units 104, 106 detect that the energy accumulator 102 has been charged to a selected level. Furthermore, the energy accumulator 102 is electrically connected and disconnected to and from the load 120 during the positive portion of the source voltage waveform 399.

In another embodiment of the invention, power is received from a D.C. source 114, the received power is stored in the energy accumulator 102, and the stored charge is transferred to the load 120 in the form of D.C. power. These steps are repeated continuously, thereby providing a nearly constant D.C. voltage to the load 120.

In this embodiment, it might be necessary to retard the charging time of the energy accumulator 102 to permit the A/D converter 128 to obtain more accurate measurements. In this case, a resistor (not shown) is electrically interposed between the switching unit 104 and the diode 105, or between the switching unit 106 and the node 116.

Figure 4:
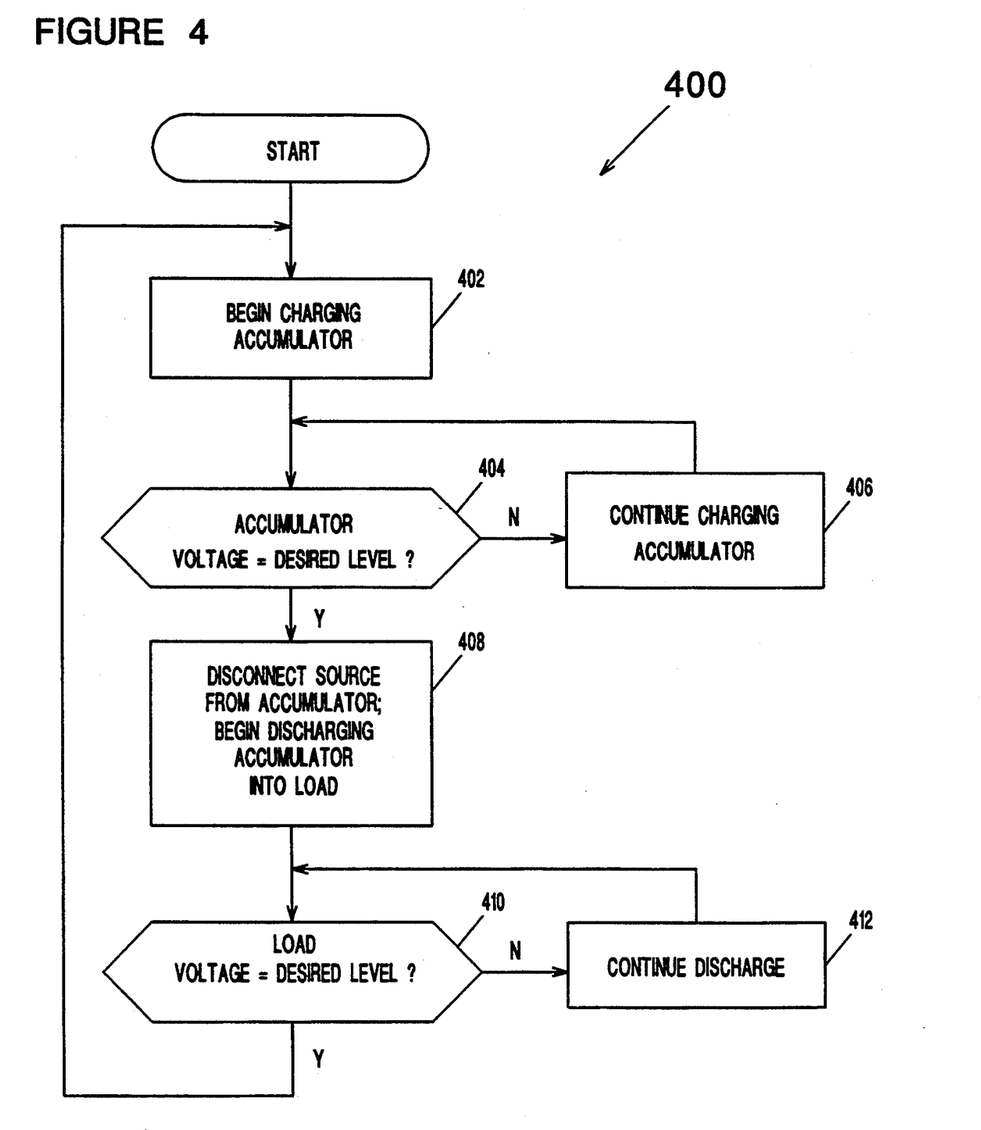
FIG. 4 is a flowchart illustrating the operation of a second embodiment of the invention utilizing a D.C. power source.

The subject embodiment operates according to a routine shown in FIG. 4, in accordance with a number of tasks 400. In task 402, the microprocessor 124 provides an enable signal to the input switching units 104, 106, causing the input switching units 104, 106 to electrically connect the D.C. power source 114 to the energy accumulator 102.

After the input switching units 104, 106 receive the enable signal in task 402, the switching units 104, 106 will electrically connect the D.C. power source 114 to the energy accumulator 102. The charging of the energy accumulator 102 will continue (task 406) until the microprocessor 124 determines in query 404, via the A/D converter 128, that the voltage stored in the energy accumulator 102 has risen to a selected level.

Then, in task 408, the microprocessor 124 discontinues the enable signal, causing the input switching units 104, 106 to electrically disconnect the D.C. power source 114 from the energy accumulator 102. Then, the microprocessor 124 provides enable signals to the output switching units 108, 110. Upon receipt of the enable signals in task 408, the output switching units 108, 110 electrically connect the energy accumulator 102 to the load 120.

In query 410, the microprocessor 124, utilizes the A/D converter 128 to determine whether the energy accumulator 102 has discharged to a desired level. Alternatively, the microprocessor 124 may utilize the A/D converter 132 to determine whether the load 120 has been charged to a selected level. Meanwhile, the energy accumulator 102 in task 412 continues to discharge. However, when the answer to query 410 is "yes," the microprocessor 124 discontinues the enable signal provided to the output switching units 108, 110, thereby disconnecting the energy accumulator 102 from the load 120. In task 412, control is returned to task 402 so that the routine 400 can repeat.

Another embodiment of the invention (not shown) is contemplated for applications were it is necessary to "step-up" the voltage or current supplied by the power source. For example, if an application requires that the load receive a voltage greater than the voltage of the power source 114, the circuitry of the invention may be duplicated as needed, with all circuits being connected to a single power source. In this case, the energy accumulators are arranged in series, and each circuit electrically connects its respective energy accumulator to the power source during a different time period. The energy accumulators arranged in series are thus capable of providing the sum of their individual voltages to the load.

Similarly, if an application requires that the load receive a current greater than the current supplied by the power source 114, the circuitry of the invention may be duplicated as needed, with all circuits being connected to a single power source. Each circuit then electrically connects its respective energy accumulator to the power source during a different time period. However, the energy accumulators are arranged in parallel, enabling them to supply the sum of the current each supplies individually.

Still another embodiment of the invention (not shown) is contemplated, wherein an adaptation of the circuit 100 is used to supply power to multiple loads. Specifically, the circuit 100 simply includes additional switching units and multiple energy accumulators 102. In this embodiment, the microprocessor 124 directs the switching units to electrically connect the power source 114 to different energy accumulators during separate intervals of the A.C. source voltage waveform 399. Similarly, during separate time intervals, the microprocessor 124 directs the switching units to disconnect the power source 114 from each energy accumulator 102, and to electrically connect each energy accumulator to its respective load.

Alternatively, in another embodiment of the invention (not shown), a single energy accumulator 102 is utilized to supply power to multiple loads. Specifically, the circuit 100 includes additional switching units to successively electrically connect the energy accumulator 102 to different loads, during different time intervals. For example, if the energy accumulator 102 is fully charged to 30 volts, the energy accumulator 102 can provide a first load with a 15 volt charge, then a second load with a 10 volt charge, and then a third load with a 5 volt charge. A number of different loads, depending upon the current requirements of each load, may be present in the circuit, each load being successively connected to a single energy accumulator 102.

Still another adaptation of the invention (not shown) is contemplated in order to transfer added power to the energy accumulator 102, or to charge more than one energy accumulator. In this embodiment, a full wave rectifier is electrically interposed between the power source 114 and the input switching units 104, 106. With this arrangement, the energy accumulator 102 may be charged twice as often, and thus receive twice the charge, as the embodiment discussed in FIG. 4.

In another embodiment of the invention (not shown), the circuit 100 of the present invention, in another embodiment, may also be re-configured for operation with a three-phase power supply. It is submitted that this re-configuration is within the ability of an ordinarily skilled artisan who has the benefit of this disclosure.

The present invention has a number of advantages over prior arrangements. In particular, unlike prior circuits, the present invention completely isolates the power source 114 from the load 120. Thus, there is no danger of power fluctuations such as voltage spikes or other noise being transferred from the power source 114 to the load 120. Additionally, the power source 114 is not damaged if the load 120 short circuits.

However, if such isolation is not desired in a particular application, the microprocessor 124 may be programmed to control the switching units 104, 106, 108, and 110 to electrically connect the power source 114 directly to the load 120. Therefore, the invention demonstrates flexibility that is absent from prior arrangements.

In addition, the present invention provides several advantages over conventional power supplies that employ transformers. For example, the present invention is less expensive and weighs less. The invention is also more efficient, since it avoids power losses from hysteresis, eddy currents, "$I^2R$", and other factors normally associated with transformers.

The invention is also beneficial since it supplies D.C. power to the load 120 irrespective of whether the power source 114 supplies D.C. or A.C power. Furthermore, the invention automatically removes power from the load 120 when the energy accumulator 102 has discharged. Additionally, the invention is more adaptable than prior arrangements since its operation is controlled by a programmable microprocessor 124. In particular, the microprocessor 124 permits connecting and disconnecting the energy accumulator 102 to and from the power source 114 and the load 120 according to the user's specifications.

While there have been shown what are presently considered to be preferred embodiments of the invention, it will be apparent to those skilled in the art that various changes and modifications can be made herein without departing from the scope of the invention as defined by the appended claims.

What is claimed is:

1. A power supply comprising:
   (a) an energy accumulator;
   (b) one or more input switching units for electrically connecting an A.C. power source to the energy accumulator in response to first control signals, and for disconnecting the energy accumulator from the power source when the voltage of the power source reaches a selected first level;

(c) one or more output switching units for electrically connecting the energy accumulator to a load in response to second control signals, and for disconnecting the energy accumulator from the load when the voltage of the energy accumulator reaches a selected second level; and (d) a microprocessor electrically connected to the power source and the switching units, and operable to provide the first and second control signals.

2. The apparatus of claim 1, further comprising a rectifier electrically interposed between the power source and input switching units, and operable to perform full wave rectification on a voltage waveform provided by the power source.

3. The apparatus of claim 1, wherein the energy accumulator comprises a capacitor.

4. The apparatus of claim 1, wherein the switching units comprise triacs.

5. The apparatus of claim 1, wherein the switching units comprise silicon controlled rectifiers.

6. The apparatus of claim 1, further comprising: a first A/D converter electrically connected to the microprocessor and the power source, and operable to provide the microprocessor with a digital representation of the voltage across the power source.

7. The apparatus of claim 1, further comprising: a second A/D converter electrically connected to the microprocessor and the energy accumulator, and operable to provide the microprocessor with a digital representation of the voltage across the energy accumulator.

8. The apparatus of claim 1, further comprising: a third A/D converter electrically connected to the microprocessor and the load, and operable to provide the microprocessor with a digital representation of the voltage across the load.

9. The apparatus of claim 1, further comprising: one or more additional switching units for electrically connecting the energy accumulator to a second load in response to third control signals provided by the microprocessor, and for disconnecting the energy accumulator from the load when the voltage of the energy accumulator reaches a selected third level.

10. A method for obtaining energy from an A.C. power source and supplying D.C. power to a load, comprising the steps of:
(a) electrically connecting the power source to an energy accumulator when the voltage of the power source reaches a selected first phase;
(b) electrically disconnecting the power source from the energy accumulator when the voltage across the energy accumulator reaches a first selected level;
(c) electrically connecting the energy accumulator to a load; and
(d) electrically disconnecting the energy accumulator from the load when the voltage across the energy accumulator reaches a second selected level.

11. The method of claim 10, further comprising the steps of maintaining a substantially constant D.C. voltage across the load by repeating steps (a)-(d).

12. The method of claim 10, further comprising the step of adjusting the selected first phase to increase or decrease the voltage supplied to the energy accumulator.

13. The method of claim 10, wherein step (b) is performed automatically by one or more triacs.

14. The method of claim 10, wherein step (d) is performed automatically by one or more triacs.

15. The method of claim 10, further comprising the step of aborting steps (c) and (d) if the current flowing through the load is greater than a selected level.

16. The method of claim 10, wherein steps (c) and (d) comprise the steps of:
measuring the voltage across the energy accumulator at two or more times;
calculating the current flowing through the load based upon said two or more voltage measurements; and
electrically disconnecting the energy accumulator from the load immediately if the current flowing through the load is greater than a selected level, otherwise electrically disconnecting the energy accumulator from the load when the voltage across the energy accumulator reaches a second selected level.

17. The method of claim 10, further comprising the step of aborting steps (c) and (d) if the signal provided by the A.C. power source is outside a selected tolerance.

18. A power supply comprising:
(a) an energy accumulator;
(b) one or more input switching units for electrically connecting a D.C. power source to the energy accumulator in response to first control signals, and for disconnecting the energy accumulator from the power source in response to second control signals;
(c) one or more output switching units for electrically connecting the energy accumulator to a load in response to third control signals, and for disconnecting the energy accumulator from the load in response to fourth control signals; and
(d) a microprocessor electrically connected to the power source and the switching units, programmed to perform steps comprising:
(a) providing the first control signals to the input switching units;
(b) providing the second control signals to the input switching units when the voltage of the energy accumulator reaches a selected first level;
(c) providing the third control signals to the output switching units; and
(d) providing the fourth control signals to the output switching units when the voltage of the energy accumulator reaches a selected second level.

19. The apparatus of claim 18, further comprising a first A/D converter electrically connected to the microprocessor and the power source, to provide a digital representation of the voltage across the power source.

20. The apparatus of claim 18, further comprising a second A/D converter electrically connected to the microprocessor and the energy accumulator, to provide a digital representation of the voltage across the energy accumulator.

21. The apparatus of claim 18, further comprising a third A/D converter electrically connected to the microprocessor and the load, to provide a digital representation of the voltage across the load.

22. The apparatus of claim 18, wherein the energy accumulator comprises a capacitor.

23. The apparatus of claim 18, wherein the switching units comprise field effect transistors.

24. A method for transferring energy from a D.C. power source to a load, comprising the steps of:
(a) electrically connecting the power source to an energy accumulator;

(b) electrically disconnecting the power source from the energy accumulator when the voltage of the energy accumulator reaches a selected first level;

(c) electrically connecting the energy accumulator to a load; and (d) electrically disconnecting the energy accumulator from the load when the voltage of the energy accumulator reaches a selected second level.

25. The method of claim 24, further comprising the step of maintaining a substantially constant D.C. voltage across the load by repeating steps (a)–(d).

26. The method of claim 24, wherein the energy accumulator comprises a capacitor.

27. The method of claim 24, further comprising the step of aborting steps (c) and (d) if the current flowing through the load is greater than a selected level.

28. The method of claim 24, further comprising the step of aborting steps (c) and (d) if the signal provided by the D.C. power source is outside a selected tolerance.

* * * * *